INVENTOR.
ANDREW J. WACHT
ATTORNEY

May 17, 1960  A. J. WACHT  2,936,636
PRESS
Filed May 2, 1958  6 Sheets-Sheet 2

INVENTOR.
ANDREW J. WACHT
BY
Gregory J. Dolgorukov
ATTORNEY

May 17, 1960 A. J. WACHT 2,936,636
PRESS
Filed May 2, 1958 6 Sheets-Sheet 3

INVENTOR.
ANDREW J. WACHT
BY
Gregory S. Dolgorukov
ATTORNEY

May 17, 1960  A. J. WACHT  2,936,636
PRESS
Filed May 2, 1958  6 Sheets-Sheet 4
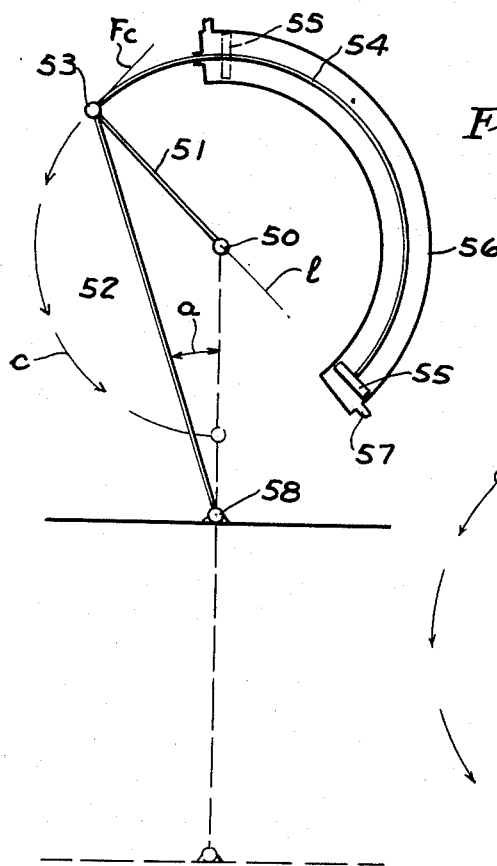
Fig. 7
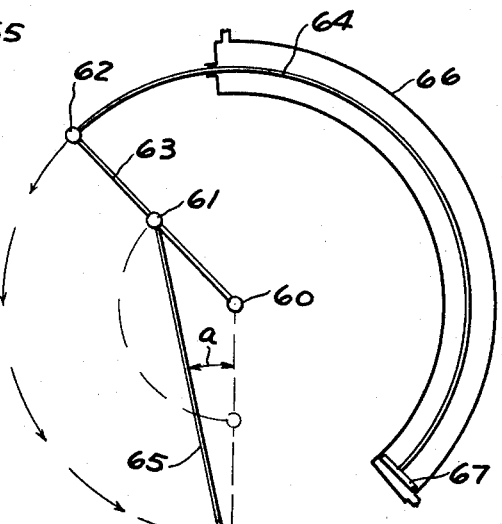
Fig. 8
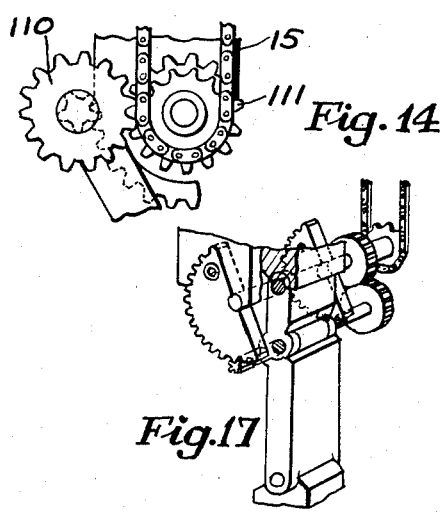
Fig. 14
Fig. 17
INVENTOR.
ANDREW J. WACHT
BY
ATTORNEY May 17, 1960 A. J. WACHT 2,936,636
PRESS
Filed May 2, 1958 6 Sheets-Sheet 5

INVENTOR.
ANDREW J. WACHT
BY
ATTORNEY

May 17, 1960 A. J. WACHT 2,936,636
PRESS
Filed May 2, 1958 6 Sheets-Sheet 6

INVENTOR.
ANDREW J. WACHT
BY
ATTORNEY

United States Patent Office 2,936,636
Patented May 17, 1960

2,936,636
PRESS
Andrew J. Wacht, Detroit, Mich.
Application May 2, 1958, Serial No. 732,513
4 Claims. (Cl. 74—106)

This invention relates to toggle linkage, and more particularly to improved means for operating the same, particularly, but not exclusively, in application to presses.

It is well appreciated in the art that toggle linkage is one of the most advantageous mechanisms for producing exceedingly high forces such as are required in presses. Therefore, toggle linkage is an expedient widely used in such applications. However, in spite of its great advantages, toggle linkage has a number of serious difficulties and limitations which have also been well appreciated in the art, and to the elimination of which much inventive effort has been directed.

One of the most serious disadvantages of presses in which toggle linkage is used is found in increased space requirements which the toggle linkage presents with respect to its linkage operating mechanisms. Generally, the operating forces developed within a device, such as a press, is applied to the linkage at the "knee" thereof, i.e. at the hinge connection between the two links. Such forces are applied generally in the direction perpendicular to the line of movement of the movable portion of the press. Therefore, mechanisms producing such forces greatly increase the dimensions of the press, particularly in the direction transverse to the line of movements of the movable portion of the press. The above is true even with respect to presses having a relatively short stroke since, in order to attain greater mechanical advantage and produce high pressure forces by the use of toggle linkage, linkage-operating mechanisms have to exert a lighter force acting through a correspondingly longer distance. Because of the above conditions, the overall dimensions of presses of this nature are relatively large compared to the length of their stroke and pressure forces developed. In the case of particularly large presses, such a condition often results in an objectionable increase not only in the size of the press frame but even in the size of the buildings for housing such press.

Another disadvantage of the presses of this general nature is found in the relatively short stroke of these presses and the varying mechanical advantages attainable therein with such advantages being particularly low at the beginning of the working stroke of the movable portion of the press. It is well appreciated in the art that the full advantage of toggle linkage is obtainable only when the two links approach their respective positions in which they become disposed along a straight line. On the other hand, when the links are in a position making a relatively small angle, such as an angle of less than 90°, a large portion of operating force is exerted on hinges and bearings and is balanced by the reactions thereof, while only a small portion of the exerted force is converted into useful force.

As a result, toggle presses are not always fully suitable for use where the force must be applied to the die mechanism through a substantial distance or where, because of the nature of the workpiece or other factors, the movable portion of the die must move up for considerable distance to permit loading of the blank or withdrawal of the formed part. In conventional presses hinge connections used for the purpose of connecting force transmitting members, such as links of a toggle linkage, utilize conventional pins which transmit the entire force from one link to the other, with the links themselves not being in force-transmitting direct contact. Therefore, due to the extremely high forces exerted on the hinges at various portions of the operative stroke, hinges of toggle linkage presses are usually exposed to very high shearing forces and, in general, present undesirable conditions of highly localized forces and bearing pressures.

One of the objects of the present invention is to provide an improved toggle linkage and means for operating the same, said linkage being particularly, but not exclusively, advantageous for use in presses, whereby the above difficulties and disadvantages are overcome and greatly reduced without creating other problems or appreciably increasing the costs involved.

Another object of the present invention is to provide a press including toggle linkage, the operative stroke of which is greatly increased as compared with presses having conventional toggle linkage.

A further object of the present invention is to provide an improved press including toggle linkage more advantageous mechanically and adapted to convert into useful force a larger portion of the operating force than is the case with conventional toggle presses.

A still further object of the present invention is to provide an improved toggle linkage for use, particularly but not exclusively in presses, in which the force balanced by the reaction forces of bearings and hinges is greatly reduced and distributed in an improved manner, thereby relieving stresses in the press.

A still further object of the present invention is to provide an improved press or a similar device, including a toggle linkage, the linkage-operating mechanisms having been so designed and arranged as to be disposed substantially within the space defined by the radius or sweep of the upper link and without the necessity of providing such means at considerable distance from the linkage and thus increasing the size of the press frame.

A further object of this invention is to provide an improved hinge connection for use, particularly but not exclusively, in toggle linkage presses, the hinge being so constructed that the hinge pin thereof which may be made hollow or solid, serves primarily to keep the linkage in the assembled condition, i.e. to prevent its separation on the return stroke of the press, with the operating pressure forces being transmitted directly from one linkage member to the other at much larger bearing surfaces than provided by hinge pins, and without subjecting the pin to severe shearing stresses caused in conventional linkages by transmission of operation forces through hinge pins.

A still further object of the present invention is to provide an improved toggle linkage for use particularly, but not exclusively, in presses in which operating force is exerted on the linkage in an improved manner and without being affected by the "crank effect," i.e. by the change in position of the links.

A still further object of the present invention is to provide an improved toggle linkage for use particularly, but not exclusively, in presses in which operating force is exerted thereon by fluid-operated means, particularly hydraulic means of a novel character, adapted to exert operating force on the driving link along a curvilinear line constituting an arcuate line and a portion of a circle through which the end of the rotating link moves.

A still further object of the present invention is to provide an improved mechanism of the nature specified in the preceding paragraph and including a curvilinear "cylinder-and-piston" means adapted to exert a uniform and continuous force along a curvilinear and particularly arcuate path.

A still further object of the present invention is to provide a mechanism of the nature specified above which is relatively simple and rugged in construction, safe and dependable in operation, and is relatively inexpensive to manufacture and to service.

Further objects and advantages of this invention will be apparent from the following description and appended claims, reference being had to the accompanying drawings forming a part of this specification, wherein like reference characters designate corresponding parts in the several views.

Fig. 7 is a diagrammatic view illustrating the concept of my improved linkage and showing fluid actuated means for operating the linkage.

Fig. 8 is a view similar in part to Fig. 7 showing the linkage of the same general nature but having greater mechanical advantage.

Fig. 14 is an end view of the construction shown in Fig. 13.

Fig. 17 is a perspective diagrammatic view showing a modified construction of the actuating pin.

Figure 1:
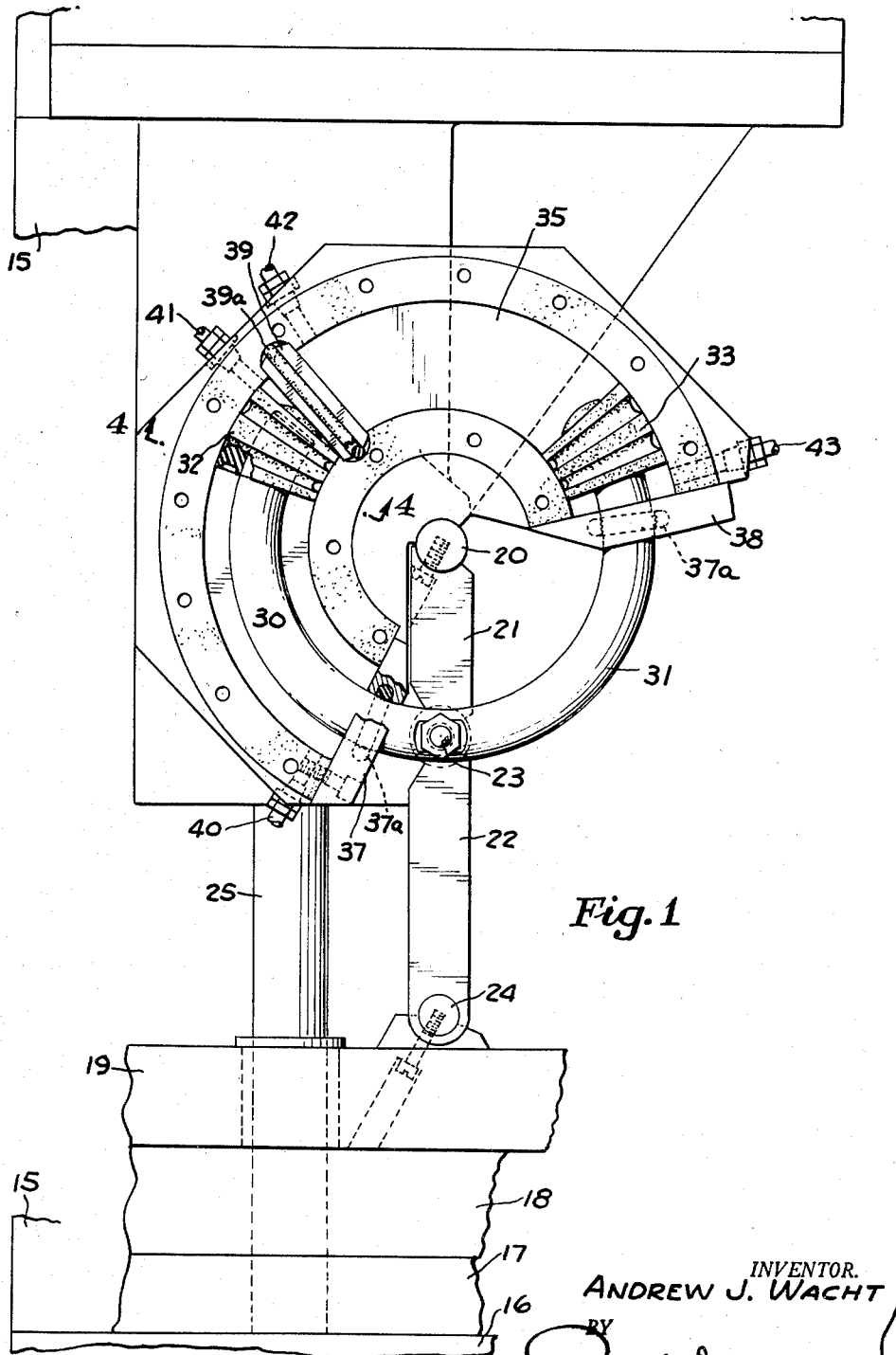
Fig. 1 is a fragmentary elevational view of a press embodying the present invention.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

In accordance with the invention I provide a toggle linkage press or other device, in which the linkage-actuating means are arranged around a fixed axis of the linkage and within the space generally defined by the length of the rotating link as a radius. By virtue of such an expedient, extension of the press sidewise and the resulting cumbersome construction are eliminated, and toggle linkage operating means and the entire press are made more balanced and compact.

Furthermore, I discard operating means for toggle linkage, which exert operating force along a straight line and perpendicularly to the line of press operation. In accordance with the invention, I provide operating means for toggle linkage, which means exert operating force on the hinge construction between the two links along an arcuate line having its center at the center of the fixed axis of the rotating link. Such means may be of mechanical nature, such as in the form of gears and similar mechanisms, or in the form of fluid actuated means, pneumatic or hydraulic.

In accordance with the invention, I also provide an improved fluid motor or means adapted to exert operating force along an arcuate line. In accordance with the invention, such means may be in the form of a member having a torus-shaped hollow with a piston slidably fitted therein. The curvature of the hollow in said member determines the path of the piston and, therefore, of the arcuate line along which the operating force is exerted. As explained above, the center of the arcuate line is at the fixed axis of the linkage. It can be easily appreciated that at the present time there is no satisfactory machining method by which a torus-shaped hollow of a circular cross section can be machined in a solid member. In accordance with the invention, the torus-shaped hollow has a rectangular cross section, and, therefore, can be speedily and economically machined on the face plate of a common lathe. My improved toggle linkage is particularly advantageous when used in a press suitable for stamping, molding and similar operations.

In the drawings there is shown, by way of example, two presses having provided therein toggle linkages and means for operating the same embodying the present invention. Referring specifically to Figs. 1–8, the press illustrated therein comprises a frame structure generally designated by the numeral 15 and broken away for the sake of clarity. On the frame structure 15 there is provided a stationary portion or table 16 adapted to receive the lower portion of a suitable die apparatus, shown diagrammatically and indicated by the numeral 17. The die portion 17 is adapted to cooperate with the upper portion 18 of the die apparatus, connected in any suitable manner to movable portion or ram 19 of the press. A stationary linkage pin 20 is provided on the frame structure of the press, which pin provides a fixed axis for the toggle linkage. The toggle linkage includes a rotating link 21 and an oscillating link 22. The rotating link 21 has its upper end hingedly connected to the fixed pin 20, while its other end is hingedly connected as shown at 23 to the upper end of the oscillating link 22. The lower end of the link 22 is hingedly connected, as shown at 24, to the movable portion 19.

Figure 3:
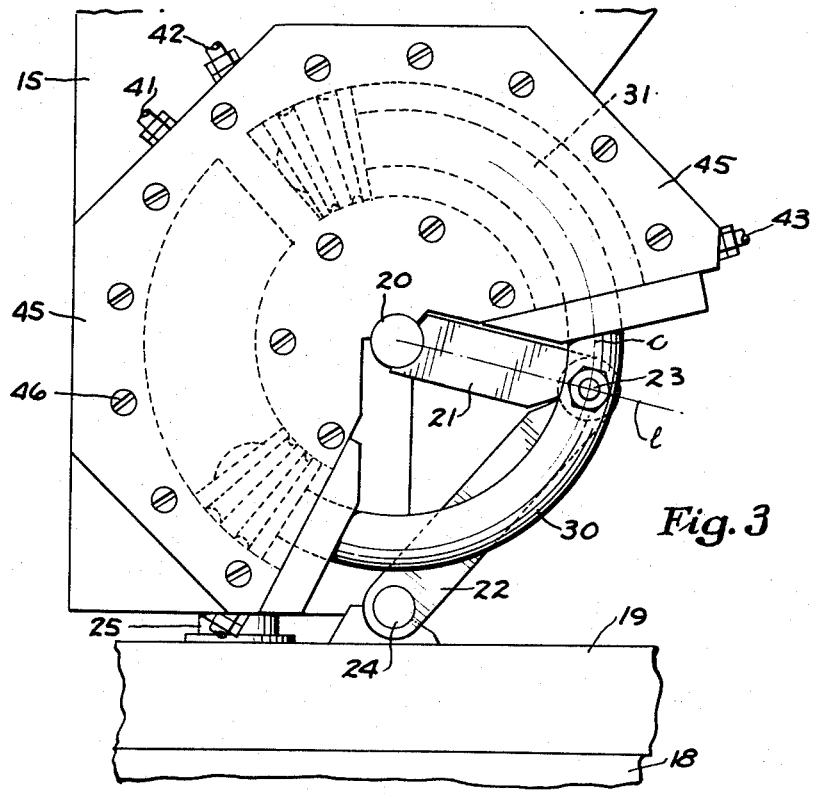
Fig. 3 is a view similar in part to Fig. 1 but showing the movable portion or punch of the die apparatus in its upper position, and the linkage in a condition corresponding to such position of the punch.
Figure 4:
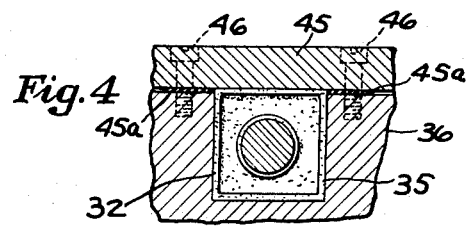
Fig. 4 is a sectional view taken in the direction of the arrows on the section plane 4—4 of Fig. 1, and illustrating the "cylinder-and-pitch" of a square cross section.
Figure 5:
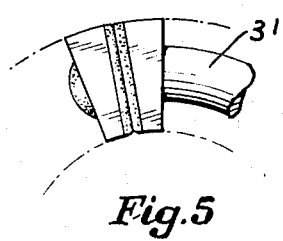
Fig. 5 shows a piston usable in the construction of Figs. 3 and 4 but of a modified construction.

Referring to Fig. 3, it will now be seen that if the linkage is brought into the position shown in said figure, the movable portion or ram 19 will be raised through a distance determined by the length of the rotating link 21 and thus brought into its upper position. Suitable guide pins such as 25 are provided in a manner well known in the art to preserve parallelism of the ram 19 with respect to the die 17.

Figure 2:
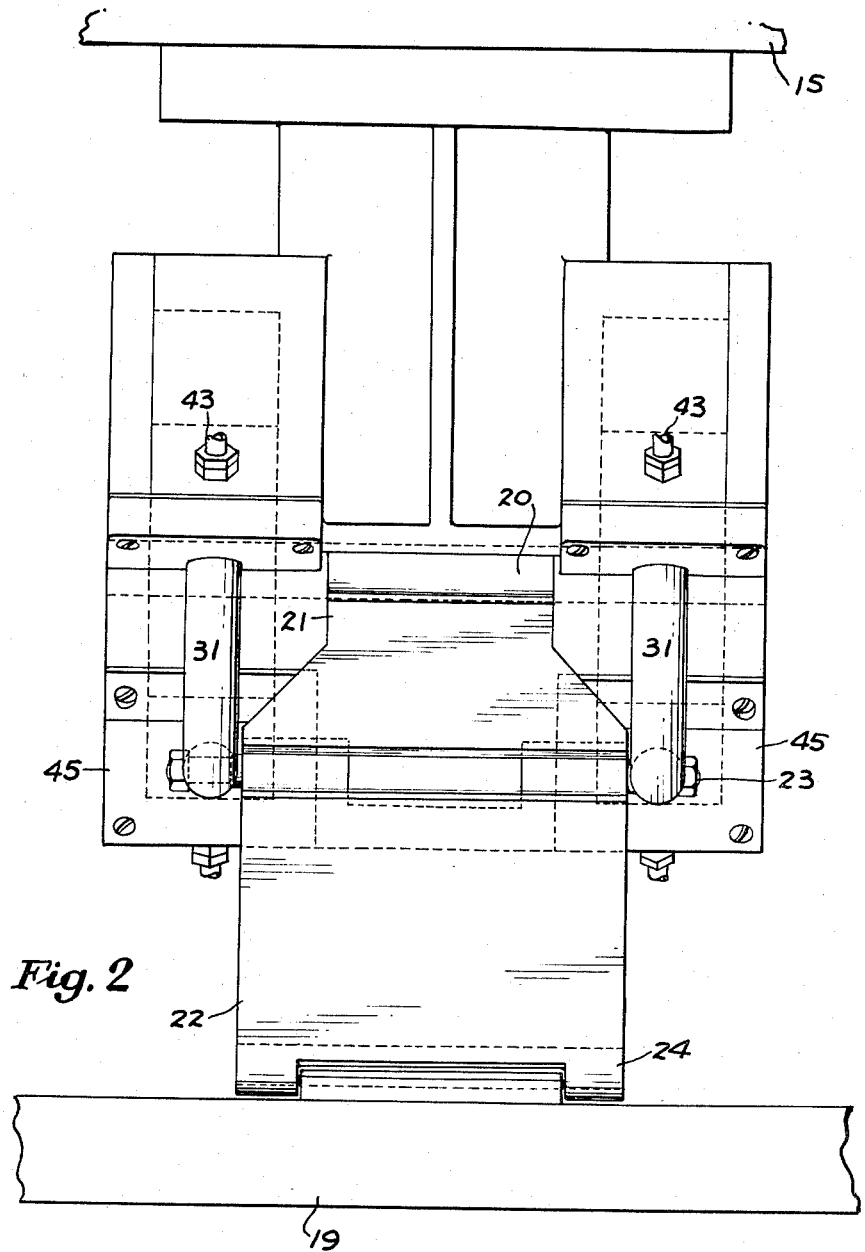
Fig. 2 is a view of the press of Fig. 1 from the other side thereof.

Means are provided to exert operating force at the other end of said link 21, thus, in effect, bypassing the body of the link 21 and relieving it from transmitting the entire operational force. Said means are of fluid operated character and are in the form of two sets of fluid operated motors arranged on both sides of the toggle linkage, as is best shown in Fig. 2. Only one set of such motors is hereinafter described in detail.

In accordance with the invention, the operating force is applied not only at the hinge connection 23 but along an arcuate line c (see Figs. 7 and 8) constituting a part of a circle determined by the distance between the centers of the hinge connections 20 and 23, and constituting the radius of the circle of which line c is a part. In other words, the direction of the force $F_c$ is always in the direction substantially perpendicular to the center line $l$ of the link 21.

Operating forces are exerted on the connection 23 with the aid of two curvilinear piston rods 30 and 31 having their ends connected to the links 21 and 22 at the connection 23 in a manner described in detail below. The opposite ends of the curvilinear piston rods 30 and 31 carry pistons 32 and 33, respectively. The pistons 32 and 33 are slidably fitted within an arcuate or torus-shaped hollow 35 of a member 36 secured to the frame structure 15 of the press in any suitable manner. The hollow 35 has its ends closed with the aid of plates 37 and 38 and is divided into two sections by the separating plate 39 having a sealing ring 39a.

Oil tube connections 40, 41, 42 and 43 communicating with the hollow 35 with the aid of ports opening thereinto are provided to convey the operating fluid, such as oil or air, into the hollow and to exhaust the same therefrom. The fluid may be pumped into such pipe lines selectively with the aid of any suitable control device, not shown, including a suitable pump preferably of the positive displacement type. Suitable valves may be provided within such a control device to direct the fluid under pressure into the desired tubes as well as to open exhaust space for the fluid which is being exhausted from the hollow 35.

It will be understood that for operating the toggle linkage to move the ram 19 downwardly, fluid under pressure is admitted through tube connections 40 and 42. At the same time, the fluid from other sides of the pistons 32 and 33 is exhausted through the tube connections 41 and 43. For the return stroke, the fluid is permitted to be exhausted through the connection 40 and 42, while fluid under pressure is admitted through the pipe connections 41 and 43. To prevent leakage around the curvilinear piston rods 30 and 31 on the return stroke of the pistons, sealing rings 37a and 38a are provided in the plates 37 and 38, respectively.

Figure 6:
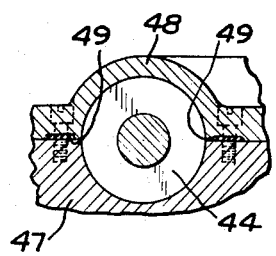
Fig. 6 is a view similar in part to Fig. 4 but showing the member having a torus-shaped hollow formed therein and a piston of circular cross section slidably fitted in said hollow.
Figure 10:
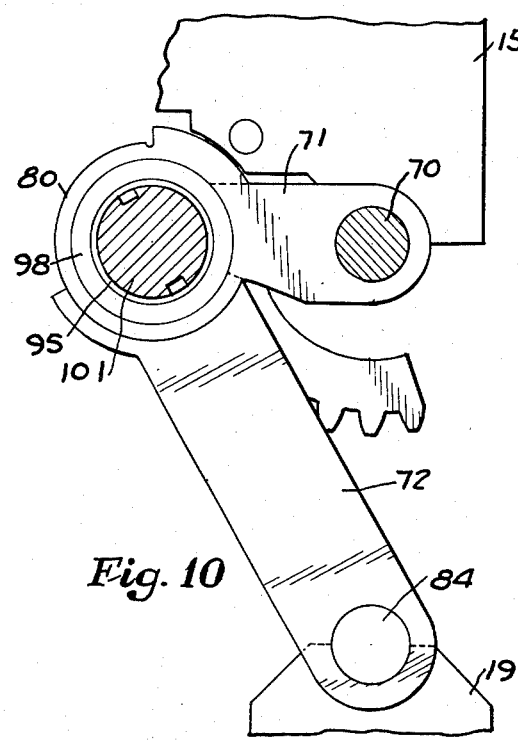
Fig. 10 is a side view partly in section showing the toggle linkage used in the construction of Fig. 9.

It may be appreciated that while machining of conventional cylinders is a standard boring operation well worked out and for which standard machine tools are available, machining a "cylinder" having a curvilinear longitudinal axis would present an exceedingly difficult, if not wholly impossible, machining operation. In accordance with the invention, the difficulty in machining such curvilinear hollows is eliminated by making the cross section of the hollow rectangular in shape. Such a hollow can be easily machined in a member such as member 36 by affixing the same to a face plate of a lathe. A cover 45 secured in any manner, such as with the aid of screws 46, to the member 36 and closing the hollow completes the hollow making it a closed space. A seal 45a is provided to ensure a fluid-tight joint.

Where provision of a torus-shaped hollow, i.e. a circular hollow having circular cross section, is desired for any reason, the same may be machined in two halves as shown in Fig. 6, wherein a hollow of half circular cross section is machined in a similar manner in the member 47, and the other hollow, also a half circular cross section, is similarly machined in the cover 48, to house a circular piston 44. After machining, the cover 48 is secured in any manner, such as with the aid of screws, to the member 47. Such a construction has a sealed joint 49 as shown and may be desirable under certain conditions.

Fig. 7 is a diagram illustrating the concept of my improved linkage and fluid actuating means for operating the same. In said figure the numeral 50 designates the fixed axis of the linkage. Links 51 and 52 are hingedly connected at 53 with the lower end of the linkage 52 secured to the sliding axis as at 58. The arcuate piston rod 54 is actuated with the aid of a piston 55 slidably fitted within an arcuate hollow 56. As fluid is admitted through the connection 57, the piston 55 moves upwardly toward its upper position shown in dotted lines causing the connecting rod 54 to exert pressure at the hinge connection 53 with the component force acting along the link 52 and exerting operating force at the point 58. Fig. 7 shows a single-piston construction. With such a construction in order to prevent the linkage from assuming a position undesirably close to its dead center, the link and its operating means are so selected as to their size and position that the angle formed by the link 52 and line of ram travel does not decrease in the upper position of the ram below a predetermined minimum, such as 35°. Use of double piston construction, such as shown in Figs. 1–6, in which one piston is pushing while the other is pulling, is intended to counteract the above condition.

It will be seen from examination of Fig. 7 that with such a construction the operating force $F_c$ always operates along an arcuate line $c$ constituting a circle the radius of which is determined by the length of the link 51. Thus, such force is always acting, in effect, perpendicularly to the center line of the link 51.

Fig. 8 illustrates a construction similar to that shown in Fig. 7, the difference being in the fact that the hinge connection 61 between the rotating links 63 and oscillating link 65 is not at the end 62 of the link 63 at which the curvilinear piston rod 64 exerts operating force on the end of the link 63 but is arranged intermediate said hinge connection 62 and the fixed axis 60. By virtue of such a construction an additional mechanical advantage or leverage is obtained. Such a construction is particularly advantageous when exceptionally high forces are required and space requirements within the press do not restrict the length of the link 63 or size of the curvilinear hollow 66 in which the piston 67 operates.

It will be understood that should it be desired to gain in the distance of travel of the movable portion of the press rather than in the magnitude of the force exerted thereon, the link 63 may be extended beyond the point 62 for any desired distance, and the oscillating link of a greater length is connected to the end of such elongated rotating link. With the force being applied in the middle of the rotating link, the distance travelled by the movable portion or ram of the press will thus be greatly increased. Yet the overall dimensions of the press would be increased much less than for a similar gain with the use of conventional mechanisms.

Figs. 9–17 illustrate a toggle press embodying the present invention and including toggle linkage operated by mechanical means. The mechanical means operating said link are of the tooth connector or gear type. Said means possess substantially the same advantages with respect to compactness of the press as the construction of Figs. 1–8, by virtue of also being arranged around a fixed axis 70 of the linkage and substantially within the space defined by the length of the rotating link 71 as the radius.

The toggle linkage utilized in this construction includes a rotating link 71 and an oscillating link 72, the end of said link 72 being connected to the movable portion or ram 19 of the press. The meeting ends of the link 71 and 72 are hingedly connected in a manner described below.

The inner or the lower end of the link 71 is recessed as indicated at 75 to receive between its two ring-like ends 77 a cylindrical extension 76. The external cylindrical surface 78 of the cylindrical extension 76 is adapted to be in direct contact with the internal cylindrical surfaces 79 of the link 71 for transmission of operating pressure forces. Similarly the external cylindrical surfaces 80 are adapted to be in direct surface contact with internal cylindrical surfaces 81 of the oscillating link 72. Moreover, internal cylindrical surfaces 82 are adapted to be in direct contact with the external cylindrical surfaces of the stationary pin 70. The fixed pin 70 is mounted within a suitable recess in the portion 15 of the press and is anchored therein with the aid of a screw 83, see Fig. 11. Similarly, the sliding axis of the link is at the center of a pin 84 similarly mounted in the movable portion or ram 19 of the press. The internal cylindrical surfaces 85 of the oscillating link 72 bear on the external cylindrical surfaces of the pin 84. The hinge connection between the links 71 and 72 is effected with the aid of a hollow pin 95 loosely fitted in the bore 96 of the cylindrical extension 76 of the member 72 and of the bores 97 of the rings 98 which may be pressed fit in the ring-like member 77. It will be understood that said rings 98 may be integral with the ring-like member 77, separation thereof being resorted to in the embodiment illustrated merely for convenience of manufacturing.

The bore 100 of the hollow connecting pin 95 receives a solid driving pin 101, the middle portion whereof is provided with the gear teeth as shown at 102. The gear portion 102 of the driving pin 101 meshes with the gear segment 103 fixed on the portion 15 of the press frame and passing through the recess 105 of the oscillating link 72. The center of the gear segment 103 is at the axis of the pin 70. It will now be seen in view of the foregoing and examination of Fig. 13 that if rotative effort is applied to the pin 101, the same will roll with its gear portion 102 on the gear segment 103 and exert pressing force on the connecting pin 95 and, therefore, on the oscillating link 72 in the movable portion or ram 19.

Means exerting rotative effort on the driving pin 101 are exemplified by the gear 110 drivingly connected to said pin and, in turn, meshing with the gear 111 mounted on the same shaft, pin 70, with a sprocket wheel 112 driven from any suitable source with the aid of a chain 113. It will now be seen in view of the foregoing and examination of Fig. 13 that if driving effort is applied to the sprocket wheel 112 in the direction indicated by the arrows, the driving pin 101 will move bodily within a cylindrical plane having its axis at the fixed axis 70 of the linkage. The driving pin 101 thus exerts driving pressure on the hinge connection between the links 70 and 72 and operates the linkage and the press in a manner similar to that described in connection with the press of Figs. 1–8.

Figure 11:
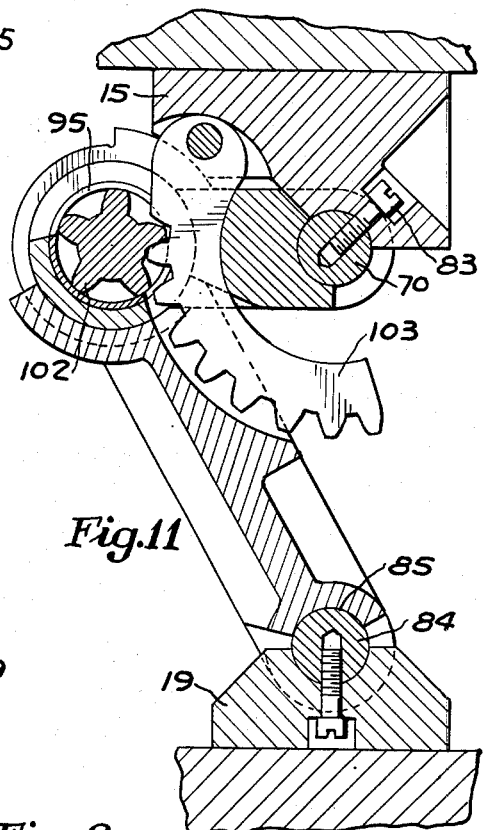
Fig. 11 is a sectional view taken in the direction of the arrows on the section plane passing through the section line 11—11 of Fig. 9.
Figure 9:
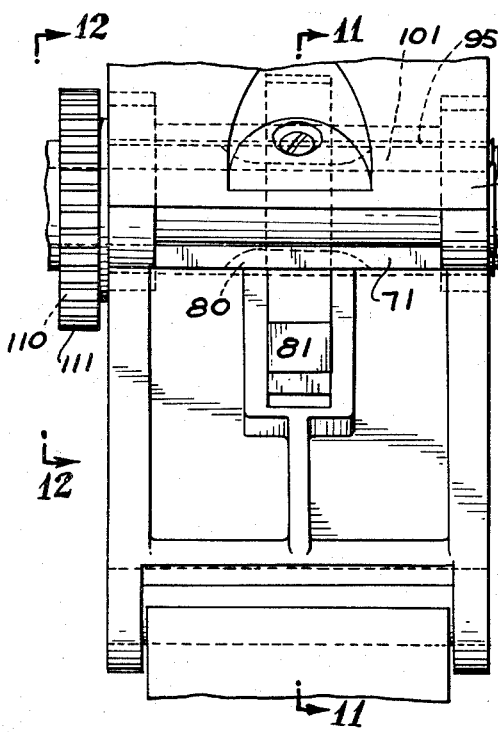
Fig. 9 is a fragmentary view of the press similar in part to Fig. 2 but showing toggle linkage operating means of mechanical character.
Figure 12:
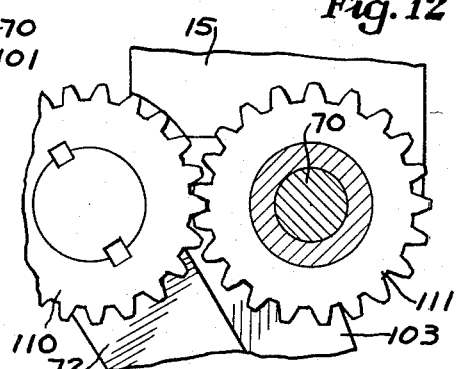
Fig. 12 is a fragmentary sectional view taken in the direction of the arrows on the section plane passing through the line 12—12 of Fig. 9.
Figure 16:
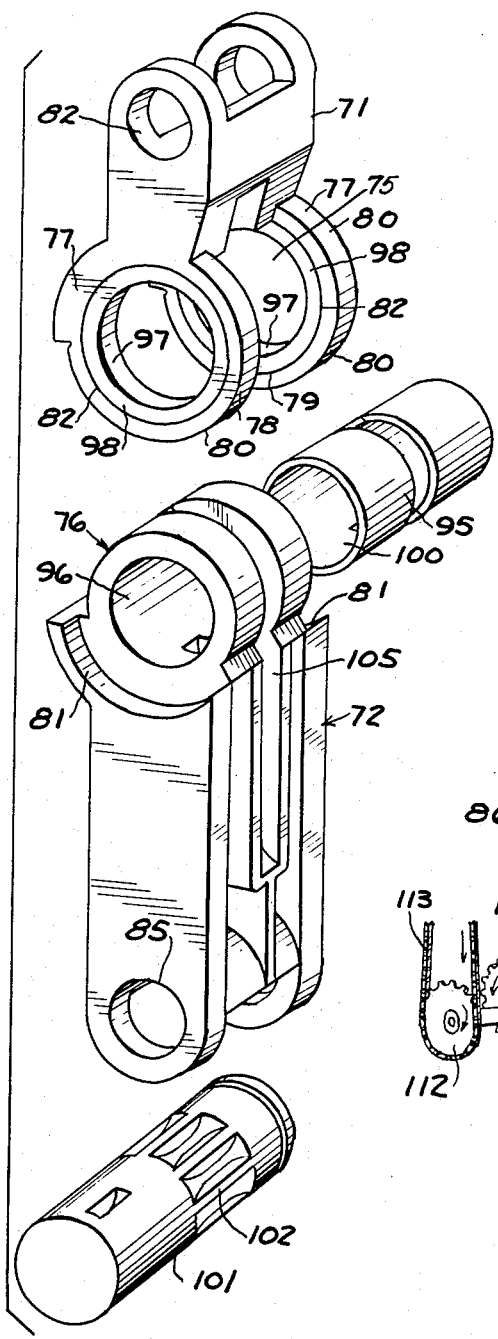
Fig. 16 is an exploded view of the linkage shown in Fig. 15.
Figure 15:
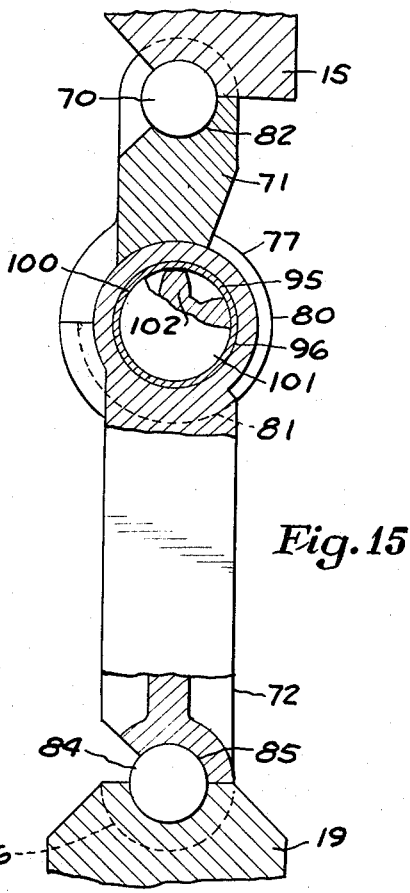
Fig. 15 is an elevational view, partly in section, of the toggle linkage in the position at the dead center.
Figure 13:
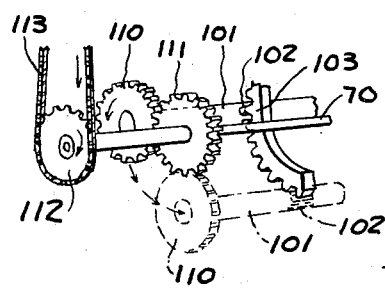
Fig. 13 is a perspective diagrammatic view illustrating in a simplified manner arrangement of main components of the linkage and mechanical means for operating the same.

While in the present embodiment of the invention the rotative effort is applied to the driving pin 101, only at one end thereof, if a better balanced construction is desired, such rotative effort may be applied at both ends of the pin. Such a construction is shown in Fig. 11. Moreover, instead of having a single gear segment 103 engaging the driving pin at the middle thereof, two of such segments may be provided for similar purposes.

By virtue of the above disclosed construction, the objects of the invention listed above and numerous additional advantages are attained.

I claim:

1. In a toggle linkage having one link with one of its ends hinged at a fixed axis, and a second link having one of its ends hinged at an axis sliding along a straight line, a hinge connection between the end of said second link and said first link, gear means bodily revolving around said fixed axis and adapted to exert operating pressure on said last hinge connection, in all operative positions of said linkage, along the line perpendicular to the line of said first link.

2. The invention defined in claim 1, with the hinge connection including a pin having pinion teeth provided thereon, a driven gear provided on said pin and adapted to be rotated around the axis of the pin to cause rotation of said pin for actuating the linkage.

3. The invention defined in claim 1, and including a gear fixed in a position to have its axis coincide with the fixed axis of the linkage, the hinge connection including a pin having a gear pinion provided thereon and meshing with the teeth of said gear to roll thereon when the axis of said hinge connection revolves bodily around said fixed axis, a driven gear provided on said pin, a driving gear meshing with said driven gear to drive the same and having its axis of rotation coinciding with said fixed axis, the respective diameters of said fixed gear and said pinion teeth provided on the pin, as well as of said driving and said driven gears being so selected that rotation of said driving gear causes said driven gear and said pinion to revolve bodily around said fixed axis and to roll on said driving gear and said fixed gear, respectively.

4. The invention defined in claim 1, and including two gears fixed in positions on both sides of said linkage to have their axes coincide with the fixed axis of the linkage, the hinge connection including a pin protruding on both sides of said linkage and having two gear pinions provided on its protrusions and meshing with said fixed gears to roll thereon when the axis of said hinge connection revolves bodily around said fixed axis, a driven gear provided on said pin, a driving gear meshing with said driven gear to drive the same and having its axis of rotation coinciding with said fixed axis, the respective diameters of said fixed gears and said pinions on the pin, and of said driving gear and said driven gear, being so selected that rotation of said driving gear causes said driven gear and said pinions to revolve bodily around said fixed axis and to roll on said driving gear and said fixed gears, respectively.

References Cited in the file of this patent

UNITED STATES PATENTS

| | | |
|---|---|---|
| 126,576 | Robertson | May 7, 1872 |
| 170,179 | Martin | Nov. 23, 1875 |
| 248,524 | Stevens | Oct. 18, 1881 |
| 299,161 | Peppard | May 27, 1884 |
| 413,264 | Robburts | Oct. 22, 1889 |
| 665,191 | Davidson | Jan. 1, 1901 |
| 1,006,157 | Weber et al. | Oct. 17, 1911 |
| 1,155,543 | Best | Oct. 5, 1915 |
| 1,332,576 | Ross | Mar. 2, 1920 |
| 1,337,817 | Bode | Apr. 20, 1920 |
| 2,342,396 | Goddard | Feb. 22, 1924 |
| 2,408,379 | Day | Oct. 1, 1946 |
| 2,540,903 | Moushey et al. | Feb. 6, 1951 |
| 2,780,830 | Kammerer | Feb. 12, 1957 |

OTHER REFERENCES

Germany, application Ser. No. E. 8208, printed June 28, 1956.